3,094,380
CONTROL OF HYDROGEN ION CONCENTRATION IN CRYSTALLIZATION OF CALCIUM HYPOCHLORITE
Everett A. Bruce, Paoli, Pa., assignor to Pennsalt Chemicals Corporation, Philadelphia, Pa., a corporation of Pennsylvania
No Drawing. Filed June 27, 1960, Ser. No. 38,755
9 Claims. (Cl. 23—86)

This invention relates to the control of the hydrogen ion concentration in chlorination and crystallization processes directed to calcium hypochlorite manufacture. More particularly, the invention is related to the control of the pH in the chlorination of calcium hydroxide in aqueous slurry to produce calcium hypochlorite in solution and in the salting out crystallization of the neutral calcium hypochlorite crystals from calcium hypochlorite solution. Neutral calcium hypochlorite crystals have the formula $Ca(OCl)_2 \cdot 2.5H_2O$.

The processes for the preparation of neutral calcium hypochlorite crystals involve, first of all, a chlorination of lime in aqueous slurry, or what is even preferable, chlorination of a mixture of lime and dibasic calcium hypochlorite in aqueous slurry to produce a saturated or supersaturated solution of calcium hypochlorite. After chlorination, the liquors are clarified to remove the lime impurities and thereafter the supersaturated solution of the calcium hypochlorite is salted out with the addition of an alkali metal salt whereupon the neutral calcium hypochlorite crystals separate from the salted solution.

After crystallization, the neutral crystals are deliquored and separated from the mother liquor and are thereafter dried and are ready for sale. The filtrates from the filtration operation still contain considerable quantities of calcium hypochlorite in solution, and this solution is directed to recovery operations usually by precipitation of the hypochlorite by the addition of lime to form dibasic calcium hypochlorite crystals, which have the formula $Ca(OCl)_2 \cdot 2Ca(OH)_2$. The dibasic calcium hypochlorite is separated from the mother liquor and then directed to the chlorinator for chlorination to produce calcium hypochlorite. The chlorination which produces solutions from which neutral calcium hypochlorite crystals are obtained may be referred to as the neutral chlorination and the product as neutral liquor.

In the neutral chlorination operation, lime or a mixture of lime and dibasic calcium hypochlorite is chlorinated in aqueous slurry by the introduction of gaseous chlorine under conditions of agitation and with the temperature controlled generally within the range of 70° F. plus or minus 10°. The amount of water charged with the lime or dibasic calcium hypochlorite is carefully regulated so that upon completion of the chlorination the solution will be saturated or supersaturated in respect to calcium hypochlorite. Care must be taken so that the supersaturation is not too great because crystallization prior to the clarification operation causes a loss of the crystals in the clarification operation.

The chlorination is discontinued while there is unreacted lime present to a small percent to maintain the liquor alkaline. Following the completion of the chlorination the chlorination liquor which is at least saturated with neutral calcium hypochlorite is clarified by passing the liquor through conventional filtering apparatus. This filtration is necessary to remove the unreactive portions of the lime which are generally known as lime slimes or muds and which are unreactive with the chlorine.

The neutral crystals are generally crystallized under conditions of agitation while maintaining a temperature within the range of 50 to 80° F. The calcium hypochlorite solution which is at least saturated in respect to calcium hypochlorite is introduced to the crystallizer and agitation begun. Eighty to 120 pounds of granular alkali metal salt, preferably sodium chloride, is added to 1000 pounds of the clarified liquor in order to salt out the neutral calcium hypochlorite crystals. These crystals are usually separated from the mother liquor within a period of about 3 hours. After crystallization is complete, the crystals are separated from the mother liquor by conventional filtration operations. The crystals are then dried and are ready for use as a sanitizer in the food and dairy industries and for swimming pools.

It is well known in the hypochlorite art that hypochlorite solutions must be maintained alkaline to preserve their hypochlorite content from loss by decomposition. Accordingly, in the manufacture of neutral calcium hypochlorite crystals I was most careful to be certain that the neutral liquor from which the neutral calcium hypochlorite was crystallized was maintained in an alkaline condition so that it would be stable in subsequent processing operations. To my great dismay I observed during the neutral calcium hypochlorite crystallization and in subsequent processing operations involving the filtrate from the neutral calcium hypochlorite filtration that these crystals and liquors decomposed even though the neutral liquor was quite alkaline. In fact, the decomposition vapors in the area of these crystals and liquors were so severe that the workmen were unable to remain in the area without the use of gas masks.

The neutral calcium hypochlorite liquor from the chlorinator was kept alkaline by leaving a residue of lime unchlorinated, generally less than 1% of the lime charged to the chlorinator. Since the chlorinator liquor was quite alkaline as it left the neutral chlorinator, other ways were sought to prevent the decomposition of the subsequent process liquors. All metal apparatus was removed from the system and rubber and neoprene tanks and processing apparatus were used in an effort to improve the stability of the liquors. Even this did not correct the excessive decomposition. Extensive work was undertaken in an effort to relate quality of the lime going into the process to the decomposition. Many different limes were selected and processed in order to evaluate the possibility of metallic impurities coming into the system with the lime itself. Even with the selection and use of only high grade chemical limes with low metal content of such metals as iron and manganese, improvement in the processing operations was not effected, and the presence of decomposition odors remained manifest in the working area.

I then tried varying the pH of the neutral calcium hypochlorite liquor to control the unwanted decomposition. I discovered that the pH control of the neutral liquor is important in the effect that it has on the deposition of crystals prior to the neutral crystallization stage. Any crystallization which takes place prior to the neutral crystallization, and which is also prior to the clarification operation, is lost from the process in the muds and slimes removed in the clarification filter. I found in the chlorination of lime slurry alone to a final pH of 11.0 that two-thirds basic calcium hypochlorite crystals precipitated and was observed in the slimes from the clarification filter. Chlorinating to a final pH of 10.4 in this operation removed the difficulty of undesired crystallization of the two-thirds basic crystal. Chlorinating to a final pH of less than 10.0 resulted in unstable liquors.

When a dibasic calcium hypochlorite slurry was chlorinated to a final pH setting of 10.0, the utilization of the calcium hydroxide by reaction with chlorine was almost quantitative and without any evidence of the formation of two-thirds basic crystals in the slimes from the clarification operation. With a pH control setting greater than 10.6 in chlorinating dibasic calcium hypochlorite the utilization of the calcium hydroxide was only 64% of theory and a great many dibasic calcium hypochlorite crystals were lost in the clarification operation. Filtration of the neutral liquor prepared from dibasic calcium hypochlorite is desirable to prevent premature crystallization.

In a process which recovers hypochlorite values from neutral mother liquor recovered as the filtrate from the filtration of neutral calcium hypochlorite crystals by precipitation of dibasic calcium hypochlorite, the neutral calcium hypochlorite is produced by chlorinating a starting material comprising a mixture of lime and dibasic calcium hypochlorite. When this mixture of dibasic calcium hypochlorite and lime slurry was chlorinated to produce neutral calcium hypochlorite liquor for subsequent crystallization, it was discovered that the pH had to be within a range of 10.0 to 10.6. At this pH the unchlorinated calcium hydroxide in the chlorinator effluent stream was 0.3 to 0.6 weight percent. Chlorination to a final pH within the range of 9.0 to 9.5 occasionally caused the entire chlorinator contents to decompose. Chlorination to a final pH above 10.6 caused the formation of crystalline two-thirds basic calcium hypochlorite which was lost with the lime slimes.

While proper pH control of the material leaving the neutral chlorinator was essential in preventing unwanted decomposition in the chlorinator or unwanted precipitation of crystals in the clarifying filter, it did not relieve the decomposition fumes arising from the hypochlorite liquors in subsequent process operations.

In a further effort to explain the instability of the hypochlorite solids and liquors I investigated the pH of the liquor going into the neutral crystallizer. Measurements of the pH of the neutral calcium hypochlorite liquor entering the crystallizer revealed that it was within the range of the pH leaving the neutral chlorinator. Finally, a check of the pH of the hypochlorite liquors during the neutral crystallization was made and to my great surprise it was discovered that a serious drop in pH took place during the neutral crystallization. It was discovered that the pH in the neutral crystallizer dropped from a value of 10.6 to 10.0 within a period of fifteen minutes and down to about 9.5 within a period of one-half hour. No further drop in pH was noticed after this interval. However, shortly after the half hour period, the noxious fumes were immediately noticeable above the neutral hypochlorite crystallizer.

I then discovered that the pH could be restored to the desired level of 10.0 to 10.6 by the addition of alkaline material such as calcium hydroxide, calcium oxide, barium hydroxide or sodium hydroxide. For example, the addition of about 1 pound of sodium hydroxide to 1000 pounds of neutral calcium hypochlorite slurry restored the pH from 9.4 to 10.6. To my pleasant surprise liquors which were restored to within the range of pH 10 to pH 10.6 in this stage of the operation remained stable throughout their further processing steps, that is, throughout the dibasic calcium hypochlorite recovery operation and the subsequent chlorination of the dibasic calcium hypochlorite to form neutral calcium hypochlorite liquor, this being a cyclic process. Moreover, the neutral calcium hypochlorite crystals which were recovered from this operation after restoration of the pH to the 10.6 control point did not decompose but maintained their hypochlorite assay throughout the drying operation.

I discovered that the alkaline material could be added prior to the addition of salt for the salting out of the neutral calicum hypochlorite, or it could be added at any point in the crystallization operation after the addition of the salt. I preferred adding the alkaline material either prior to, along with the salt, or immediately after the salt addition in order to prevent the formation of the noxious fumes and concurrent losses of hypochlorite values.

To obtain a desired pH in the neutral chlorinator a Brown-Beckman pH controller was used. An industrial type pH meter sensed the condition in the chlorinator and a recording electronic potentiometer indicated and recorded the pH values. The potentiometer also contained a pneumatic control system with adjustable reset and proportioning band which operated a diaphragm value in the chlorine feed line. With this system it was possible to control the pH to within plus or minus 0.10 pH units. Glass electrodes were employed in the sensing element of a special high alkalinity type. These were Beckman Nos. 8990 Type E and 8970 which are glass and calomel reference electrodes respectively.

The best mode of practicing my discoveries will be evident from the a consideration of the following examples.

EXAMPLE 1

Four hundred and eighty-one pounds of calcium hydroxide containing 24 pounds of impurities and 2,159 pounds of water was introduced to a lime slurry make-up tank containing an agitator and then the lime slurry was transferred and chlorinated in a rubber lined chlorinator. The temperature in the chlorinator was maintained by automatic controls and circulating brine at a temperature of 70° plus or minus 3° F. Chlorine was fed to the chlorinator from a cylinder containing liquid chlorine. The chlorine gas from the cylinder passed through an automatic control valve which was actuated by a Brown-Beckman pH controller. Chlorination was continued until the pH dropped to 11.3 at which point a portion of the chlorinated lime solution was filtered. The filter slurries or muds were then analyzed for calcium hypochlorite, total chlorine and calcium hydroxide. The chlorination was then continued to a lower pH and the sampling and analytical work was repeated. The water input to the batch was regulated so that the final chlorinated liquor was within the range of saturated to 10% supersaturated in respect to calcium hypochlorite content. The results of these tests varying the pH between 11.3 and 10.0 are set in Table 1.

*Table 1*

ANALYSES OF FILTER MUDS FROM FILTRATION OF CHLORINATED AQUEOUS LIME SLURRY TO A SELECTED pH

| pH | Mud Analysis, percent by Weight | | |
|---|---|---|---|
| | $Ca(OCl)_2$ | Total $Cl_2$ | $Ca(OH)_2$ |
| 10.0 | 8.6 | 9.9 | 1.4 |
| 10.2 | 10.72 | 9.7 | |
| 10.4 | 10.77 | 9.64 | 2.32 |
| 10.5 | 11.8 | 8.29 | 6.06 |
| 10.7 | 12.38 | 5.91 | 2.82 |
| 10.9 | 13.5 | 11.0 | 5.84 |
| 11.3 | 18.1 | 11.3 | 21.3 |

It is noted that at a pH of 10.5 the slimes contained 11.8% calcium hypochlorite whereas at a pH of 10.4 the calcium hypochlorite content of the slimes was 10.8%. At 10.9 the calcium hypochlorite content of the slimes had increased to 13.5% and at a pH of 11.3 the calcium hypochlorite content of the slimes had increased to 18.1%. The high calcium hypochlorite content of the slimes, that is, higher than 10.8, indicates the presence of two-thirds basic calcium hypochlorite crystals lost in the lime muds and slimes.

EXAMPLE 2

Twelve thousand, one hundred and nine pounds of dibasic cake was prepared by the reaction of neutral calcium hypochlorite mother liquor with lime to crystallize dibasic calcium hypochlorite which was then filtered and introduced to the neutral chlorinator along with 8,250 pounds of water. The dibasic cake contained 1,006 pounds pounds of calcium hydroxide and 1,029 pounds of calcium hypochlorite. Minor amounts of sodium chloride and calcium chloride were also present. The slurry was chlorinated to produce a chlorinated liquor 5% supersaturated with respect to calcium hypochlorite. Following the procedure set forth in Example 1 analyses of the slimes from the filtration operation following the chlorination are noted in Table 2.

*Table 2*

ANALYSES OF FILTER MUDS FROM FILTRATION OF CHLORINATED DIBASIC CALCIUM HYPOCHLORITE TO A SELECTED pH

| pH | Slime Analysis, percent by Weight | | |
|---|---|---|---|
| | $Ca(OCl)_2$ | Total $Cl_2$ | $Ca(OH)_2$ |
| 10.0 | 17.5 | | 5.47 |
| 10.5 | 20.3 | | 14.2 |

At a pH control setting of 10.0 chlorine acceptance based on the calcium hydroxide input was nearly 100% and there was no evidence of dibasic or two-thirds basic crystals in the slime or overflow form the chlorinator. At a pH control setting of 10.5 the chlorine acceptance based on the calcium hydroxide feed was only 64% of theory and many dibasic crystals were present in the slime from the chlorinator overflow as indicated by the high analyses for both calcium hypochlorite and calcium hydroxide in the slime.

EXAMPLE 3

In chlorinating a mixture comprising 80% of the total calcium hydroxide requirement introduced as dibasic calcium hypochlorite slurry and the remaining 20% of the calcium hydroxide requirement introduced as an aqueous 17% calcium hydroxide slurry the pH of the liquor at completion of the chlorination was varied between 10.0 and 10.6 by the procedure set forth in Example 1. Analyses of the slimes from the filtration of the neutral calcium hypochlorite liquor produced by the chlorination were made at each pH set point to determine the proper conditions in the chlorinator. The chlorinated liquor analyzed 20.7 grams of calcium hypochlorite per 100 grams of water and 10.5 grams of calcium chloride per 100 grams of water and was supersaturated in respect to calcium hypochlorite. The results of the analyses at the various pH control points are set forth in Table 3.

*Table 3*

ANALYSES OF FILTER MUDS FROM FILTRATION OF A SOLUTION OF CHLORINATED DIBASIC CALCIUM HYPOCHLORITE AND LIME TO A SELECTED pH

| pH Control | Slime Analysis, percent by Weight | | |
|---|---|---|---|
| | $Ca(OCl)_2$ | Total $Cl_2$ | $Ca(OH)_2$ |
| 10.0 | 13.2 | (a) | 2.95 |
| 10.2 | 13.8 | (a) | 5.1 |
| 10.4 | 13.4 | 7.63 | 10.4 |
| 10.6 | 22.2 | 11.9 | 19.4 | a Not analyzed.

It was noted that above a pH of 10.2 the percent calcium hydroxide in the slime rose very rapidly from 5.1 to 10.4 and 19.4 indicating that a basic hypochlorite salt, either the dibasic calcium hypochlorite or the two-thirds basic hypochlorite crystal, was being formed in the chlorinator, was not being chlorinated and hence was lost in the slimes from the filtration.

Thus, it is apparent that there is an optimum control point for the chlorination of either a dibasic calcium hypochlorite slurry or of a pure lime slurry or of a mixture of dibasic slurry and lime slurry. The mixture of dibasic and lime slurry is normally used in a process wherein the hypochlorite values from the neutral crystal filtration are recovered from the motor liquor by a process in which dibasic calcium hypochlorite crystals are precipitated, filtered, dispersed in water and again chlorinated to produce additional neutral calcium hypochlorite. The preferred pH control range is 10.0 to 10.6.

EXAMPLE 4

Sixteen thousand, one hundred and eighty-six pounds of filtered neutral liquor slightly supersaturated in respect to calcium hypochlorite and at a pH of 10.6 was introduced to the neutral crystallization vessel which comprised a rubber lined cylindrical tank with agitator. Nineteen hundred and twenty pounds of sodium chloride was added after the solution was under agitation. The change with pH over a time interval of 3 hours from the time of salt addition is set forth in Table 4.

*Table 4* pH CHANGE DURING NEUTRAL CRYSTALLIZATION

| Time, Hrs.: | pH |
|---|---|
| 0 | 10.60 |
| 0.5 | 9.55 |
| 1.0 | 9.57 |
| 1.5 | 9.55 |
| 2.5 | 9.53 |
| 3.0 | 9.51 |

EXAMPLE 5

Fifteen thousand, eight hundred and ninety-one pounds of clarified neutral liquor at a pH of 10.6 was introduced to the crystallizer and 1,920 pounds of salt was added after agitation was begun. This liquor analyzed 20.3 grams calcium hypochlorite per 100 of water, 10.2 grams of calcium chloride per 100 of water and 17 grams sodium chloride per 100 of water prior to crystallization and was supersaturated with respect to calcium hypochlorite. Five and three tenths pounds of a 50% sodium hydroxide solution was added to the neutral crystallization vessel immediately after the salt addition. At 0 hours after the salt addition the pH was 10.6; at 0.5 hour, the pH was 10.52; at 1.0 hour, the pH was 10.58; at 1.5 hours, the pH was 10.56; at 2.5 hours, the pH was 10.55 and at 3.0 hours, the pH was 10.58.

EXAMPLE 6

Example 5 was repeated except that 6.2 pounds of calcium oxide was substituted for the sodium hydroxide. The pH remained within the range of 10.5 to 10.6 throughout the 3 hour period.

I claim:

1. In the process for the manufacture of neutral calcium hypochlorite comprising chlorinating calcium hydroxide in aqueous medium at a concentration to produce approximately a saturated solution in respect to calcium hypochlorite, the improvement comprising chlorinating to a pH within the range of 10.0 to 10.6, clarifying the said calcium hypochlorite solution, adding alkali metal salt to the said hypochlorite solution to crystallize neutral calcium hypochlorite, adding alkaline material to the said crystallization to maintain the pH within the range of 10.0 to 10.6 during the crystallization and thereafter separating the neutral calcium hypochlorite crystals from the mother liquor.

2. The process of claim 1 in which the alkaline material is selected from the group consisting of calcium hydroxide, calcium oxide, barium hydroxide and sodium hydroxide.

3. The process of claim 1 in which the alkaline material is sodium hydroxide.

4. The process of claim 1 in which the alkaline material is calcium hydroxide.

5. The process of claim 1 in which the alkaline material is calcium oxide.

6. In the crystallization of neutral calcium hypochlorite by the salting out crystallization of calcium hypochlorite liquors at least saturated with respect to hypochlorite ions, the improvement comprising adding sufficient alkaline materials to the said crystallization to maintain the pH within the range of 10.0 to 10.6 during the crystallization.

7. The process of claim 6 in which the alkaline material is sodium hydroxide.

8. The process of claim 6 in which the alkaline material is calcium hydroxide.

9. The process of claim 6 in which the alkaline material is calcium oxide.

References Cited in the file of this patent

UNITED STATES PATENTS

| | | |
|---|---|---|
| 1,883,649 | Engberg | Oct. 18, 1932 |
| 1,931,622 | Reitz et al. | Oct. 24, 1933 |
| 2,061,332 | Rue | Nov. 17, 1936 |
| 2,438,781 | Kamlet | Mar. 30, 1948 |
| 2,441,337 | Sprauer | May 11, 1948 |
| 2,869,987 | Horn | Jan. 20, 1959 |
| 2,869,988 | Gloss | Jan. 20, 1959 |